(12) United States Patent
Bookman et al.

(10) Patent No.: US 7,752,299 B2
(45) Date of Patent: *Jul. 6, 2010

(54) SEGMENTATION AND PROCESSING OF CONTINUOUS DATA STREAMS USING TRANSACTIONAL SEMANTICS

(75) Inventors: Lawrence A. Bookman, Weston, MA (US); David Albert Blair, Wayland, MA (US); Steven M. Rosenthal, Lexington, MA (US); Robert Louis Krawitz, Chestnut Hill, MA (US); Michael J. Beckerle, Needham, MA (US); Jerry Lee Callen, Cambridge, MA (US); Allen Razdow, Cambridge, MA (US); Shyam R. Mudambi, Wayland, MA (US)

(73) Assignee: International Business Machines Corporation, Armonk, NY (US)

( * ) Notice: Subject to any disclaimer, the term of this patent is extended or adjusted under 35 U.S.C. 154(b) by 249 days.

This patent is subject to a terminal disclaimer.

(21) Appl. No.: 11/871,527

(22) Filed: Oct. 12, 2007

(65) Prior Publication Data

US 2008/0270403 A1 Oct. 30, 2008

Related U.S. Application Data

(63) Continuation of application No. 11/002,833, filed on Dec. 2, 2004, now Pat. No. 7,644,050.

(51) Int. Cl.
*G06F 15/173* (2006.01)
(52) U.S. Cl. ........................ 709/223; 709/203; 709/219; 709/231; 707/202; 714/15

(58) Field of Classification Search ................. 709/203, 709/217, 219, 223–225, 229, 231; 714/15; 718/101; 707/202

See application file for complete search history.

(56) References Cited

U.S. PATENT DOCUMENTS

| 5,363,503 | A | 11/1994 | Gleeson |
| 5,465,328 | A | 11/1995 | Dievendorff et al. |
| 5,740,355 | A | 4/1998 | Watanabe et al. |
| 5,819,021 | A | 10/1998 | Stanfill et al. |
| 5,850,508 | A | 12/1998 | Lee et al. |
| 5,872,907 | A | 2/1999 | Griess et al. |

(Continued)

FOREIGN PATENT DOCUMENTS

EP 0790558 8/1997

OTHER PUBLICATIONS

Gray, Jim, et al. Transaction Processing: Concepts and Techniques, Morgan-Kaufman Publishers, 1993, pp. 210-217.

(Continued)

*Primary Examiner*—Oanh Duong
(74) *Attorney, Agent, or Firm*—Yee & Associates, P.C.; Elissa Y. Wang

(57) ABSTRACT

With a continuous source of data relating to transactions, the data may be segmented and processed in a data flow arrangement, optionally in parallel, and the data may be processed without storing the data in an intermediate database. Data from multiple sources may be processed in parallel. The segmentation also may define points at which aggregate outputs may be provided, and where checkpoints may be established.

20 Claims, 7 Drawing Sheets

U.S. PATENT DOCUMENTS

| | | | |
|---|---|---|---|
| 5,909,681 | A | 6/1999 | Passera et al. |
| 6,006,225 | A * | 12/1999 | Bowman et al. ............ 707/5 |
| 6,029,139 | A | 2/2000 | Cunningham et al. |
| 6,032,267 | A | 2/2000 | Fishler et al. |
| 6,289,474 | B1 | 9/2001 | Beckerle |
| 6,353,834 | B1 * | 3/2002 | Wong et al. ............ 707/202 |
| 6,377,996 | B1 | 4/2002 | Lumelsky et al. |
| 6,442,533 | B1 | 8/2002 | Hinkle |
| 6,480,626 | B1 | 11/2002 | Venable |
| 6,490,610 | B1 | 12/2002 | Rizvi et al. |
| 6,535,851 | B1 | 3/2003 | Fanty et al. |
| 2002/0034330 | A1 | 3/2002 | Lennon et al. |

OTHER PUBLICATIONS

Koo, Richard, et al. "Checkpointing and Rollback-recovery for Distributed Systems," IEEE Trans. Software Eng., SE-13-23-31, Jan. 1987.

Li, Kai, et al. "Checkpoint Multicomputer Application," in Proc. 10th IEEE Symp. Reliable Distributes Sys. pp. 2-11, Oct. 1991.

Tamir, Y. et al. "Error Recovery in Multicomputers Using Global Checkpoints," Proc. 13th Int. Conf. Parallel Processing, pp. 32-41, Aug. 1984.

Wang, Y.M. et al. "Lazy Checkpoint Coordination for Bounding Rollback Propagation," in Proc. 12th Symp. On Reliable Distributed Sys., pp. 78-85, Oct. 1993.

Wojcik, Z.M.; B.E., "Fault tolerant distributes computing using atomic send-receive checkpoints", Parallel and Distributed Processing, 1990. Proceedings of the Second IEEE.

Kai Li: Naughton, J.F.; Plank, J.S., "Low-latency, concurrent checkpointing for parallel programs", Parallel and Distrubuted Systems, IEEE Transactions on, vol. 5 Issue: 8, Aug. 1994 pp. 874-879.

Aldana, J.F., et al., "Load balancing and query optimization in dataflow parallel evaluation of datalog programs", IEEE, 1994, pp. 682-688.

Barclay, Tom, "Loading databases using dataflow parallelism", Digital Equipment Corporation, San Francisco Systems Center.

* cited by examiner

SEGMENTATION AND PROCESSING OF CONTINUOUS DATA STREAMS USING TRANSACTIONAL SEMANTICS

RELATED APPLICATIONS

This application claims the benefit under Title 35 U.S.C. §119(e) of co-pending U.S. Provisional Application Ser. No. 60/140,005, filed Jun. 18, 1999, entitled "SEGMENTATION AND PROCESSING OF CONTINUOUS DATA STREAMS USING TRANSACTIONAL SEMANTICS" by Lawrence A. Bookman et al., the contents of which are incorporated herein by reference. This application also claims the benefit under Title 35 U.S.C. §119(e) of co-pending U.S. Provisional Application Ser. No. 60/185,665, filed Feb. 29, 2000, entitled "SEGMENTATION AND PROCESSING OF CONTINUOUS DATA STREAMS USING TRANSACTIONAL SEMANTICS" by Lawrence A. Bookman et al., the contents of which are incorporated herein by reference.

This application is a continuation of application Ser. No. 11/002,833, filed Dec. 2, 2004 now U.S. Pat. No. 7,644,050.

BACKGROUND

Computer-based transaction systems generate data relating to transactions performed using those systems. These data relating to transactions are analyzed to identify characteristics of the transactions. From these characteristics, modifications to the transactions and/or associated marketing may be suggested, or other business decisions may be made.

Computer systems for analyzing data relating to transactions generally access the data stored in a database. After the data has been collected for some period of time, the collected data is added to the database in a single transaction. As discussed, data stored in the database is analyzed and results are produced. The results obtained from the analysis typically represent aggregation of the data stored in the database. These results are then used, for example, as the basis for various business decisions and are also often stored in a database.

In some cases, the raw data relating to transactions are not retained in the database after they are processed. Such processing of data relating to transactions generally is a form of batch processing. In batch processing, results are not output until all the data is processed. If, for example, each record associated with a batch were stored in the database in a separate transaction, a significant amount of overhead would be incurred by a database management system associated with the database. Similarly, a large volume of data is read from the database in a single transaction to permit analysis on the data. In many cases, the time between a transaction occurring and the generation of results using data about the transaction may be days or even weeks.

SUMMARY

If the data relating to transactions are generated by the transaction system continuously, or if a desired time frame for receiving the results of analysis is shorter than the time required to perform batch processing, such batch processing techniques cannot be used. Delays in obtaining results of analysis are often undesirable where the behavior of users of the transactions may change frequently. For example, in a database system for tracking system access information in real-time having frequent changes, it may be unacceptable to have periodic availability of access analyses for security or performance reasons.

Given a continuous source of data relating to transactions, the transaction data may be segmented and processed in a data flow arrangement, optionally in parallel, and the data may be processed without storing the data in an intermediate database. Because data is segmented and operated on separately, data from multiple sources may be processed in parallel. The segmentation may also define points at which aggregate outputs may be provided, and where checkpoints may be established. By partitioning data into segments and by defining checkpoints based upon the segmentation, a process may be restarted at each defined checkpoint. In this manner, processing of data may fail for a particular segment without affecting processing of another segment. Thus, if processing of data of the particular segment fails, work corresponding to that segment is lost, but not work performed on other segments. This checkpointing may be implemented in, for example, a relational database system. Checkpointing would enable the relational database system to implement restartable queries, and thus database performance is increased. This is beneficial for database vendors and users whose success relies on their systems' performance. To generalize, if a data stream can be partitioned, then checkpoint processing and recovery can be performed.

These and other advantages are provided by the following.

According to one aspect, a method is provided for processing a continuous stream of data. The method comprises steps of receiving an indication of transactional semantics, applying the transactional semantics to the continuous stream of data to identify segments of the continuous stream of data, processing the data in each segment of the continuous stream of data to produce results for the segment, and after the data of each segment of the continuous stream of data is processed, providing the results produced for that segment.

According to one embodiment, the data includes a plurality of records, each record includes a plurality of fields, and the transactional semantics are defined by a function of one or more fields of one or more records of the data. According to another embodiment, the method further comprises a step of partitioning the continuous stream of data according to the identified segments. According to another embodiment, the step of partitioning includes a step of inserting a record in the continuous stream of data indicating a boundary between two segments. According to another embodiment, the record is a marker record indicating only a boundary. According to another embodiment, the record is a semantic record including information related to the transactional semantics.

According to another embodiment, the continuous stream of data is a log of information about requests issued to a server, and the step of applying comprises steps of reading information relating to a request from the log; and applying the transactional semantics to the read information. According to another embodiment, the information relating to each request includes a plurality of fields, and wherein the transactional semantics are defined by a function of one or more fields of information relating to one or more requests. According to another embodiment, the information includes a time at which the request was issued to the server and wherein the transactional semantics define a period of time. According to another embodiment, the method further comprises a step of filtering the log to eliminate information relating to one or more requests. According to another embodiment, the step of filtering is performed prior to the step of applying the transactional semantics. According to another embodiment, the step of filtering includes a step of eliminating information relating to requests associated with spiders. According to another embodiment, the method further comprises a step of filtering the continuous stream of data to eliminate data from the continuous stream of data.

According to another embodiment, the method further comprises an additional step of processing the data in each segment of the continuous stream of data to produce the results for the segment, and after the data of each segment of the continuous stream of data is processed during the additional step of processing, providing the results produced for that segment. According to another embodiment, the step of processing comprises steps of partitioning data in each segment as a plurality of parallel partitions; and processing each of the partitions in parallel to provide intermediate results for each partition. According to another embodiment, the method further comprises a step of combining intermediate results of each partition to produce the results for the segment. According to another embodiment, the data in the continuous stream of data has a sequence, and there are multiple sources of the continuous stream of data, and the method further comprises determining whether data in the continuous stream of data is in sequence; and if the data is determined to be out of sequence, interrupting the step of processing, inserting the data in a segment according to the transactional semantics, and reprocessing the segment and continuing the step of processing. According to another embodiment, method further comprises saving a persistent indication of the segment for which data is being processed; when a failure in the step of processing is detected, discarding any results produced by the step of processing for the selected segment and reprocessing the selected segment corresponding to the saved persistent indication; and when the step of processing completes without failure, providing the outputs produced as an output and selecting the next segment.

According to another aspect, a processes is provided for checkpointing operations on a continuous stream of data by a processing element in a computer system. The process comprises steps of receiving an indication of transactional semantics; applying the transactional semantics to the data to partition the continuous stream of data into segments for processing by the processing element; selecting one of the segments; saving a persistent indication of the selected segment; processing the selected segment by the processing element to produce results; when a failure of the processing element is detected, discarding any results generated by the processing element for the selected segment and reprocessing the selected segment corresponding to the saved persistent indication; and when processing by the processing element completes without failure, providing the outputs produced by the processing element as an output and selecting the next segment to be processed by the processing element. According to another embodiment, the step of applying includes inserting data in the continuous stream of data indicating boundaries between segments of the data.

According to another aspect, a computer system is provided for checkpointing operations on a continuous stream of data in a computer system. The computer system comprises means for receiving an indication of transactional semantics; means for applying the transactional semantics to the continuous stream of data to partition the data into segments; means for selecting one of the segments; means for saving a persistent indication of the selected segment; a processing element for processing the selected segment to produce results; means, operative after a failure of the processing element is detected for discarding any outputs generated by the processing element for the selected segment and means for directing the processing element to reprocess the selected segment corresponding to the saved persistent indication; and means, operative after processing by the processing element completes without failure, for providing the results produced by the processing element and selecting the next segment to be processed by the processing element. According to another embodiment, the means for applying includes inserting data in the continuous stream of data indicating boundaries between segments of the data.

According to another aspect, a method is provided for processing a continuous stream of data. The method comprises receiving an indication of transactional semantics; applying the transactional semantics to the continuous stream of data to identify segments of the continuous stream of data; and inserting data in the continuous stream of data indicating boundaries between the identified segments of the continuous stream of data.

Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears.

DETAILED DESCRIPTION

The following detailed description should be read in conjunction with the attached drawings in which similar reference numbers indicate similar structures. All references cited herein are hereby expressly incorporated by reference.

Figure 1:
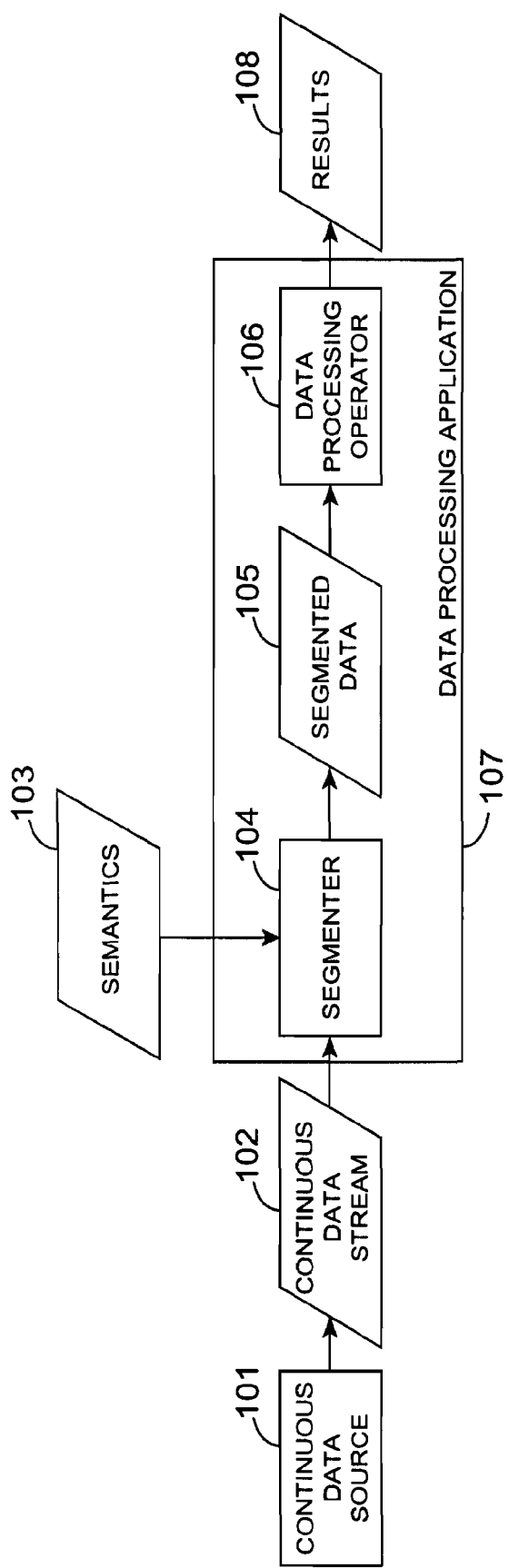
FIG. 1 is a dataflow diagram showing a system which processes continuous data according to one embodiment of the invention.

Referring now to FIG. 1, a continuous data source 101 provides a continuous stream 102 of data that is processed by the data processing application 107 to provide results 108 according to some transactional semantics 103. These transactional semantics 103 may be information that determine how stream 102 should be segmented. Semantics 103, for example, may depend upon some requirement of the system in operating on stream 102 or depend on a business requirement for analyzing data. In the data processing application 107, the data is segmented by a segmenter 104 according to the transactional semantics 103 to provide segmented data 105. A data processing operator 106 processes data within each segment of the segmented data 105 to provide results 108 for each segment. These processes may be, for example, reading or updating of one or more portions of data in the continuous data stream 102.

The continuous data source 101 generally provides data relating to transactions from a transaction system. The source is continuous because the transaction system generally is in operation for a period of time to permit users to make transactions. For example, the continuous data source may be a Web server that outputs a log of information about requests issued to the Web server. These requests may be stored by the Web server as log records into a server log. Other example sources of continuous streams of data include sources of data about transactions from a reservation system, point-of-sale system, automatic teller machine, banking system, credit card system, search engine, video or audio distribution systems, or other types of systems that generate continuous streams of data. There also may be one or more continuous data sources providing one or more continuous streams of data, and application 107 may be configured to operate on these streams.

The data relating to a transaction generally includes a record for each transaction, including one or more fields of information describing the transaction. The record may be in any of several different formats. Data relating to a transaction, for example, may have a variable or fixed length, may be tagged or untagged, or may be delimited or not delimited. Data relating to a transaction may be, for example, in a markup language format such as SGML, HTML, XML, or other markup language. Example constructs for communicating the data from the continuous data source 101 to the data processing application 107 include a character string, array or other structure stored in a file, a database record, a named pipe, a network packet, frame, cell, or other format. According to one aspect, the continuous stream 101 of data is a server log, and example data relating to a transaction may include a user identifier, a client program and/or system identifier, a time stamp, a page or advertisement identifier, an indicator of how the page or advertisement was accessed, a record type, and/or other information regarding the transaction.

Transactional semantics 103 define a function of one or more fields of one or more records of the continuous stream of data 102. For example, transactional semantics 103 may define a period of time, e.g., an hour, so that all data within a one hour period are placed in one segment. Transactional semantics 103 may also define an aggregate function of several records, e.g., a total volume of sales, rather than a function of a single record, such as a time. Such transactional semantics 103 may also be derived from business rules indicating information to be obtained from analysis of the data. Transactional semantics 103 may also depend on some system requirement. This analysis may be performed, for example, on a per-segment basis to enable a business decision.

Transactional semantics 103 are applied by the segmenter 104 to the continuous stream of data 102 to identify segments in the continuous stream of data 102. The continuous stream of data 102 may be partitioned according to these identified segments in many ways. For example, a record may be inserted into continuous stream of data 102 indicating a boundary between two segments in the stream of data. The record may be a marker record that indicates only a boundary. For example, a tag may be placed in all records such that a marker record has one value for the tag and data records have another value for the tag. Alternatively, the record may be a semantic record that includes information related to the transactional semantics, such as the transactional semantics themselves or some information derived by applying the transactional segments to the data, such as a specification of a period of time. Further, application 107 may permit multiple data processing operators 106 to access the data segments according to the transactional semantics stored in the data. Any type of information may be used to indicate partitions in stream of data 102.

Multiple segmenters 104 also may be used to produce different segmented continuous streams of data 105 for which different processing may be performed. Alternatively, multiple data processing operators 106 may be used in parallel to perform different analyses on the segmented continuous stream of data 105.

There are many kinds of operations that may be performed by data processing operator 106. For example, data aggregations such as counts of records, sums of variables within the records, and statistical values such as the mean, maximum and minimum of various data fields may be computed for each data segment. In an application where the continuous stream of data is a server log, it is possible to compute a unique number of users, for example, to whom each item of information has been provided by the server in each segment, or in a combination of segments. Various data processing operators 106 may be added or deleted from the data processing application 107 to provide a variety of different results 108.

Data processing application 107 may be implemented using the Orchestrate parallel framework from Torrent Systems, Inc. such as described in U.S. patent application Ser. No. 08/627,801, filed Mar. 25, 1996 and entitled "Apparatuses and Methods for Programmable Parallel Computers," by Michael J. Beckerle et al.; U.S. patent application Ser. No. 08/807,040, filed Feb. 24, 1997 and entitled "Apparatuses and Methods for Monitoring Performance of Parallel Computing," by Allen M. Razdow, et al.; and U.S. patent application Ser. No. 09/104,288, filed Jun. 24, 1998 and entitled "Computer System and Process for Checkpointing Operations on Data in a Computer System by Partitioning the Data," by Michael J. Beckerle, and as described in U.S. Pat. No. 5,909,681, issued Jun. 1, 1999 and entitled "A Computer System and Computerized Method for Partitioning Data for Parallel Processing," by Anthony Passera, et al.

In such systems, parallel data sources are processed in a data flow arrangement on multiple processors. In particular, each operation to be performed in FIG. 1, such as segmentation or data analysis, may be implemented as an operator in the Orchestrate parallel processing framework. Using a parallel application framework, data processed by the data processing operator is partitioned into a plurality of parallel partitions. Each of these parallel partitions is processed in parallel by a different instance of the data processing operator, each of which provides intermediate results for its respective partition. These intermediate results may be combined to provide aggregate results for the segment by an operator that performs an aggregation function.

Further, processing parallel data streams using the Orchestrate parallel processing framework, various operators may be configured to process these parallel data streams, and a multiple input operator is used to combine the two data streams to form a single datastream. The single datastream may also be operated upon by various operators, stored, transmitted or other data operation may be performed on the datastream.

Data processing operator 106 may be implemented in several ways. In particular, data processing operator generally 106 may process data either in a batch mode or continuous mode. If the data processing operator 106 performs batch processing, it does not output data until all of the data associated with the batch entry has been processed. Operator 106 may be controlled by a program executing a continuous loop that provides the data to the operator on a per segment basis. This program identifies to the operator that the end of the data has been reached at each segment boundary, thereby causing the operator 106 to output results for the segment. Alternatively, continuous operators may be used which include steps that cause the operator 106 to output results at each segment boundary.

Segmented continuous stream of data 105, in any of its various forms, also may be stored as a parallel data set in the Orchestrate parallel framework. A parallel data set generally includes a name, pointers to where data actually is stored in a persistent form, a schema, and metadata (data regarding data) defining information such as configuration information of hardware, disks, central processing units, etc., indicating where the data is stored. One data set may be used to represent multiple segments, or separate data sets may be used for each segment.

If a system such as the Orchestrate parallel application framework is used for the data processing applications, the continuous stream of data 102 may be imported into a data set in the application framework from the form of storage, in which the continuous data source 101 produces the continuous stream of data 102. As an example, the continuous data source 101 may be an HTTPD server that produces data regarding requests received by the HTTPD server, and the server saves this data into a log. A separate application, commonly called a log manager, periodically creates a new log file into which the HTTPD server writes data.

For example, a new log file may be created for each day. Information regarding how the log manager creates log files is provided to a data processing operator 106 such as an import operator which reads the set of log files as a continuous stream of data into a data set in the Orchestrate application framework. There may be one or more import operators, or one or more instances of the same operator processing in parallel, that operate on log files in parallel. There also may be a plurality of sources of log files, which may be processed in parallel by multiple instances of the import operator. For example, multiple HTTPD servers may write to the same log file in parallel. That is, the multiple HTTPD processes generate parallel streams of data which are processed by one or more input operators. A multiple input operator may be used to combine these data stream into a single data stream, upon which additional operators may operate.

Figure 2:
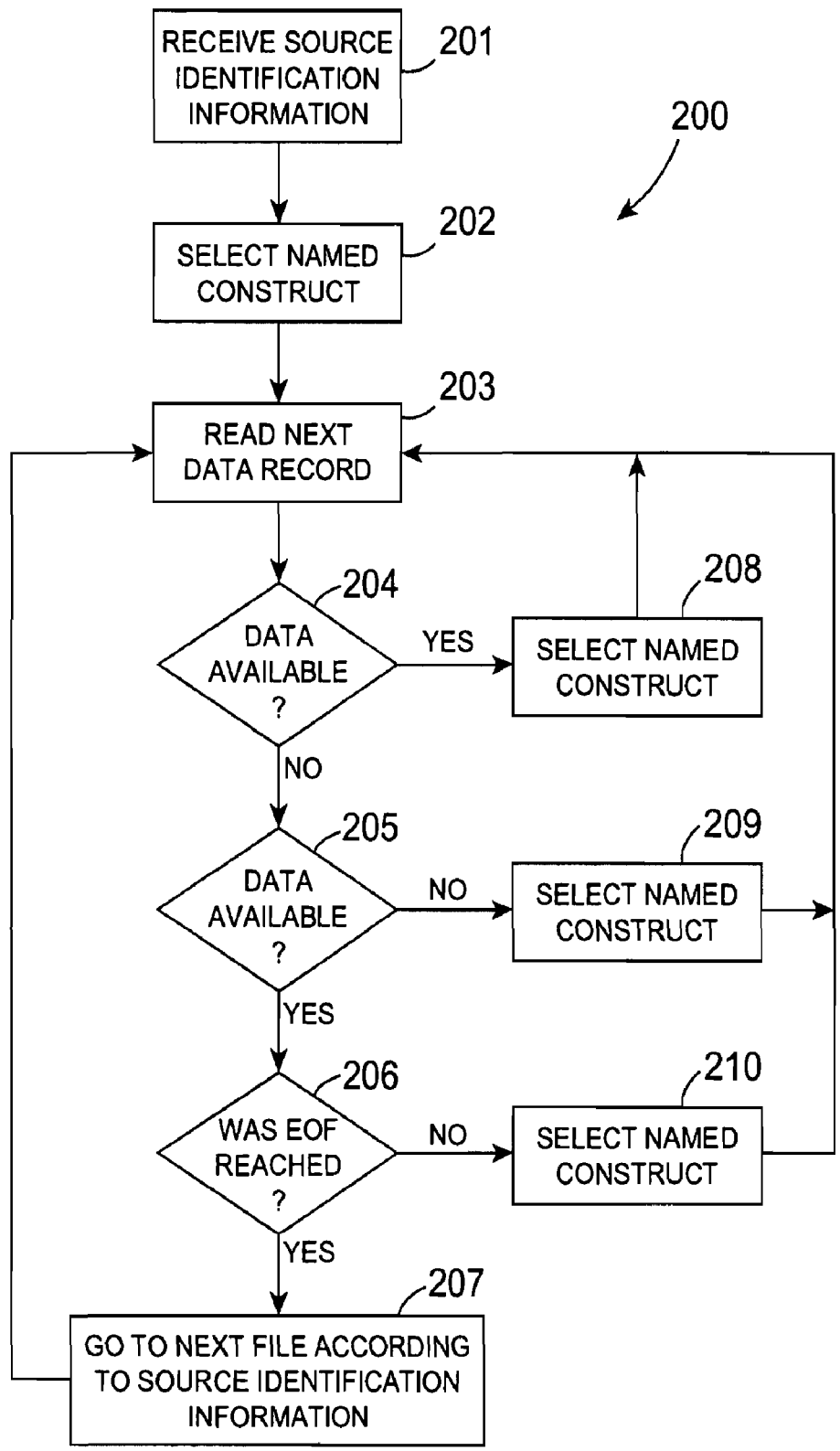
FIG. 2 is a flowchart describing operation of how data may be imported from a continuous source of data into a parallel application framework.

A flowchart describing the operation of an importation process 200 performed by data processing application 107 will now be described in connection with FIG. 2. The importation process 200 relies on source identification information received in step 201. This identification information identifies a naming convention for data files, named pipes or other constructs used by the continuous source of data 102. A named construct is then selected in step 202 according to the received source identification information. Any next data record is read from the named construct in step 203. A verification step also may be performed to verify that the correct named construct was accessed if the construct contains identification information. If the read operation performed in step 203 returns data, as determined in step 204, the data is provided to the next operator in step 208. The next operator may be a filtering operation, an operation that transforms the data record into another format more suitable for segmentation and processing or may be the segmenter. Processing continues by reading more data in step 203. In this manner, the importer continuously reads data from the specified continuous data source, providing some buffering between the continuous data source and the data processing application.

If data is not available when the read operation is performed, as determined in step 204, it is first determined whether the server is operating in step 205. If the server is not operating in step 205, the system waits in step 209 and attempts reading data again in step 203 after waiting. The waiting period may be, for example, random, a predetermined number, or combination thereof. If the server is operating and an end of file is not reached, as determined in step 206, the transaction system may be presumed to be operating normally and merely has not been used to produce data relating to a transaction. After step 206, the importer process 200 may wait for some period of time and/or may issue a dummy record to the next operator, as indicated in step 210, before attempting to read data again in step 203. If the end of file is reached, as determined in step 206, the next file (or other named construct) is selected in step 207 according to the source identification information, after which, processing returns to step 203. This process 200 may be designed to operate without interruption to provide data continuously to data processing application 107.

Segmentation of the continuous stream of data 102 also provides a facility through which checkpointing of operations generally may be performed. In particular, a persistent indication of a segment being processed may be saved by an operator 106. When a failure during the processing performed by the operator 106 is detected, any results produced by the operator 106 for the selected segment may be discarded. The segment then may be reprocessed using the saved persistent indication of the segment being processed. If operator 106 completes processing without failure, the outputs produced by operator 106 may be output before the next segment is processed. This use of segments to checkpoint operations enables operations on a continuous stream of data to be checkpointed using transactional semantics which partition the continuous stream of data into segments. The segmentation can be used to define partitions for checkpointing, that may be performed in the manner described in "Loading Databases Using Dataflow Parallelism," *Sigmod Record*, Vol. 23, No. 4, pages 72-83, December 1994, and in U.S. patent application Ser. No. 09/104,288, filed Jun. 24, 1998 and entitled "Computer System and Process for Checkpointing Operations on Data in a Computer System by Partitioning the Data," by Michael J. Beckerle. Checkpointing also may be performed using a different partitioning than the segmentation based on transactional semantics.

In the Orchestrate application framework, the importation operation described above in connection with FIG. 2 and the segmenter may be implemented as a composite operator to enable checkpointing of the entire data processing application from the importation of the continuous stream of data to the output of results. Checkpointing of the import process also may be performed according to the transactional semantics. For example, if a time field is used, the entire step can be checkpointed on a periodic basis, such as one hour, thirty minutes, etc.

In some applications, the continuous source of the data may be interrupted, for example due to failures or for other reasons, and may provide data out of an expected sequence. In some applications, the out-of-sequence data may be discarded. However, in some analyses, the out-of-sequence data may be useful. In such applications, the out-of-sequence data are identified and inserted into the appropriate segment and that segment is reprocessed. Out-of-sequence data may be detected, for example, by monitoring the status of the continuous source of data 101. When a source of data 101 becomes available, after having been previously unavailable, processing of other segments is interrupted, and the out-of-sequence data from the newly available source is processed. Data from this continuous source of data is then appended to the end of the data set in which it belongs. Upon completion, the continuous operation of the system is then restarted. Such interruption and the reprocessing of data from a segment also may be performed in a manner similar to checkpointing.

Figure 3:
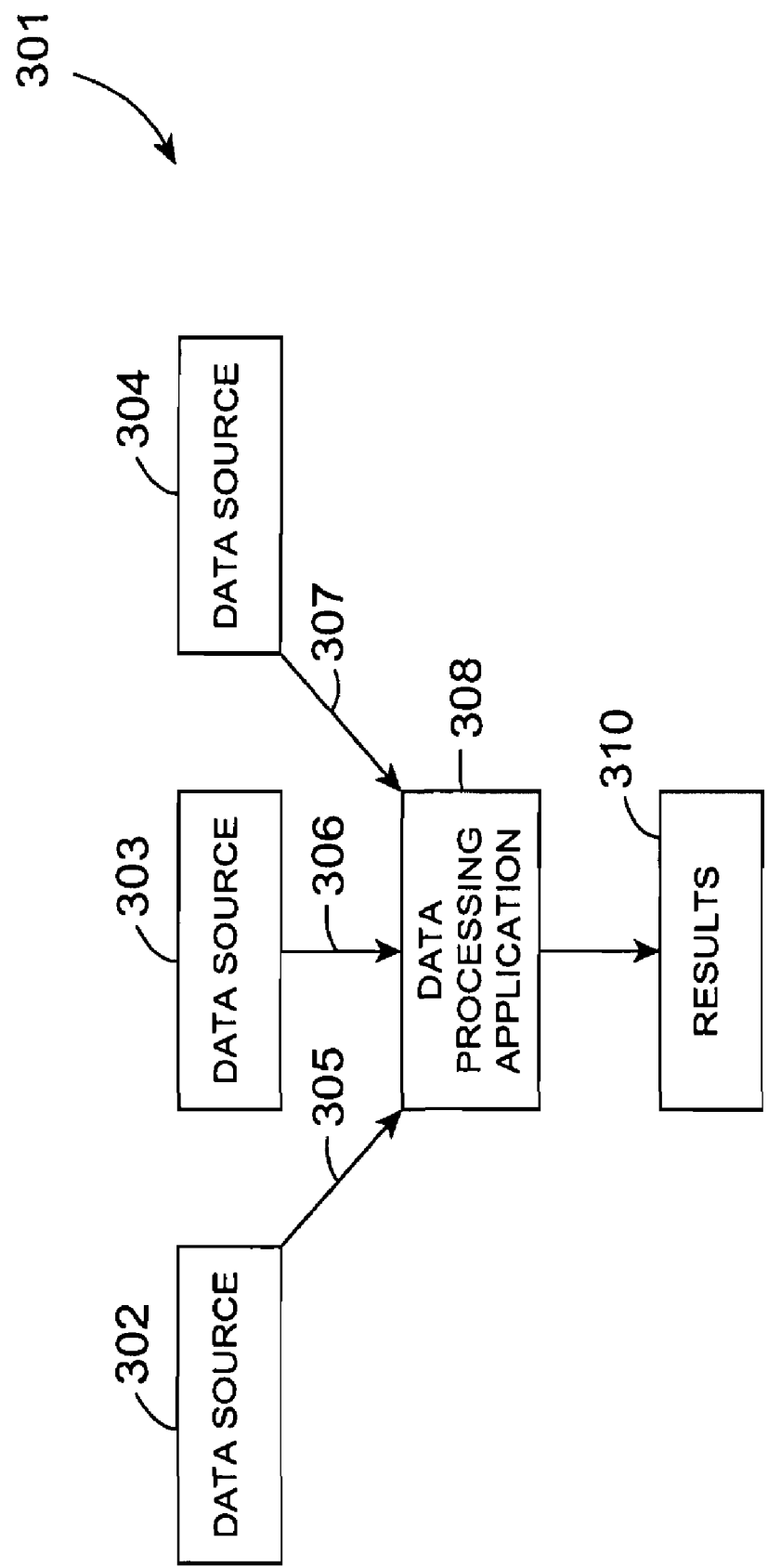
FIG. 3 is an alternative dataflow diagram showing a system which processes multiple data streams.

As discussed above, data processing application 107 may be configured to process multiple continuous data streams 102 in a parallel manner. FIG. 3 shows a data processing application 308, similar in function to data processing application 107, that receives parallel continuous data streams 305-307 from a number of different data sources 302-304. Data processing application 308 is configured to operate on these individual streams 305-307 and to provide one or more results 310. In particular, results 310 may be for example a consolidated stream of data as a function of input streams 305-307. In particular, results 310 may be a real-time stream of records that may be stored in a database. According to one embodiment, the database is a relational database, and the relational database may be capable of performing parallel accesses to records in the database.

System 301 as shown in FIG. 3 is an example system that processes multiple parallel data sources. Particularly, these sources may be HTTPD servers that generate streams of log file data. Without such an architecture 301, log file information must be consolidated from the multiple sources and then processed in a serial manner, or multiple processes must individually process the separate streams of data. In the former case, throughput decreases because a sequential bottleneck has been introduced. In the latter case, a programmer explicitly manages the separate parallel processes that process the individual streams and consolidates individual stream data.

System 301 may support multiple dimensions of parallelism. In particular, system 301 may operate on partitions of a data stream in parallel. Further, system 301 may operate on one or more streams of data using a parallel pipeline. In particular, as shown in FIG. 1, segmenter 104 may accept one or more continuous data streams 102 and operate upon those in parallel, and there may be a number of data processing operators 24 that operate on the discrete streams of data.

Figure 4:
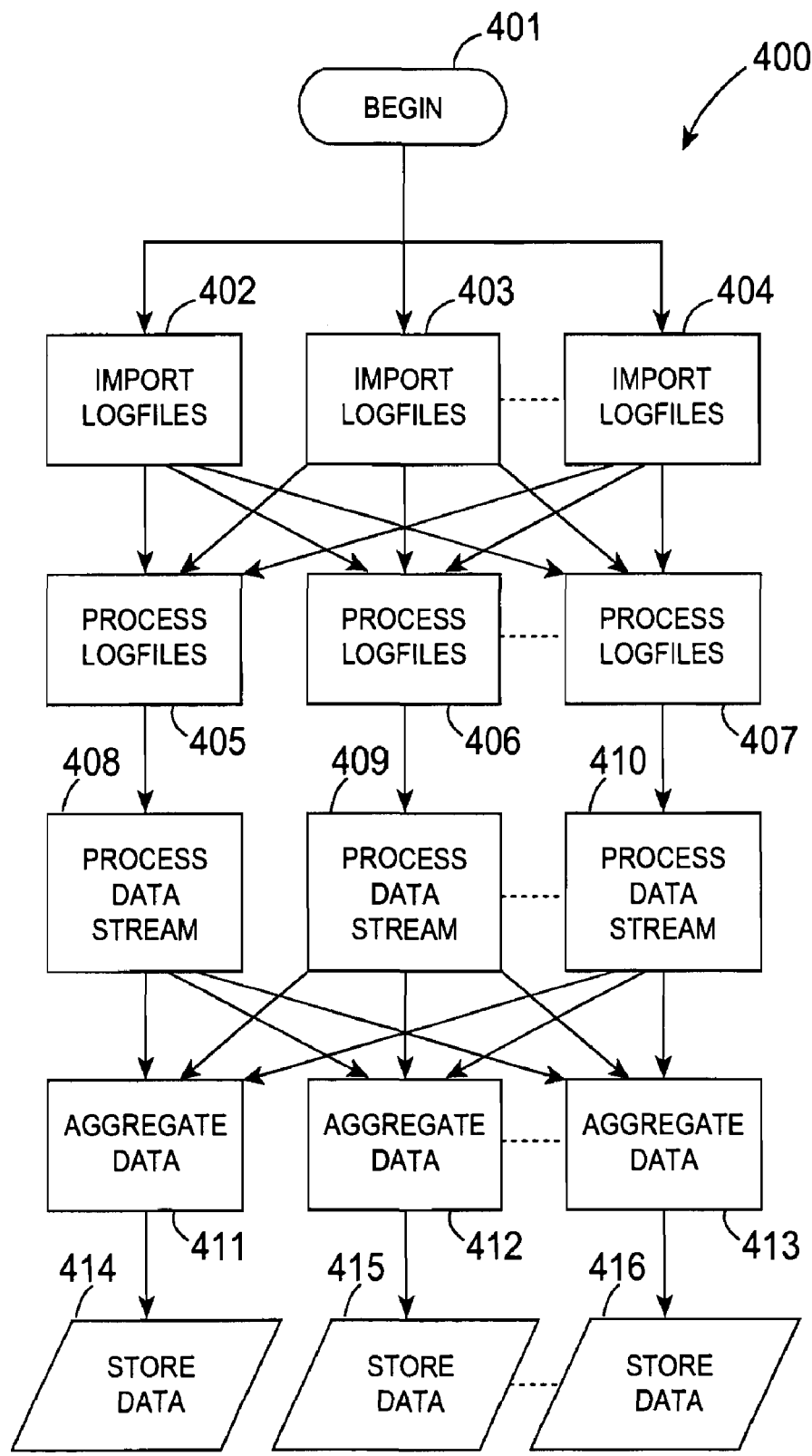
FIG. 4 is a flowchart describing how data may be processed by a multiple pipeline system.

FIG. 4 shows a dataflow wherein multiple continuous data sources produce multiple continuous data streams, respectively. At step 401, process 400 begins. At steps 402-404, system 301 may import a plurality of log files. These import processes may occur in parallel, and the results of these import processes may be passed off to one or more data processing operators 106 which perform processing upon the log files at steps 405-407. Although three data streams are shown, system 301 may process any number of parallel data streams, and include any number of parallel pipelines. The results of these import processes may repartition the data stream and reallocate different portions of the data stream to different data processing operators 106.

At steps 405-407, these log files are processed in a parallel manner, typically by different threads of execution of a processor of system 301. Processings that may be performed may include sort or merge operations to elements of the input data stream. These sort and merge processes may be capable of associating like data, or otherwise reorganizing data according to semantics 103 or predefined rules. At steps 408-410, each stream is processed, respectively by, for instance, a data processing operator 106. These data operators may perform functions including data detection, cleansing, and augmentation. Because input data streams can contain bad data, system 301 may be capable of detecting and rejecting this data. This detection may be based upon specific byte patterns that indicate the beginning of a valid record within the data stream, or other error detection and correction facilities as is known in the art. Because as much as one-third of all internet traffic experienced by HTTPD processes is generated by spiders, one or more portions of an incoming data stream may be "cleansed." In particular, there may exist general-purpose components for filtering and modifying records in a data stream. These components may operate, for example, according to predefined rules setup by a user through management system 505 discussed below with respect to FIG. 5.

Further, items in the data stream may be augmented with other information. For example, Web site activity may be merged with data from other transactional sources in real-time, such as from sales departments, merchandise, and customer support to build one-to-one marketing applications. Therefore, system 301 may be capable of augmenting data streams based on, for instance, in-memory table lookups and database lookups. For example, augmenting a data stream with all the advertisers associated with a given ad would allow a user to perform a detailed analysis of advertising revenue per ad. Other types of data augmentation could be performed.

At steps 411-413, data for multiple streams may be aggregated. In particular, system 301 may provide several grouping operators that analyze and consolidate data from multiple streams. This provides, for example, the ability to analyze Web activity by efficiently grouping and analyzing data across several independent dimensions. More particularly, information needed to provide an accurate assessment of data may require an analysis of data from multiple sources. At steps 414-416, aggregated stream data is stored in one or more locations. In particular, data may be aggregated and stored in relational database. According to one embodiment, system 301 may store information in a parallel manner in the relational database.

System 301 may be implemented, for example as a program that executes on one or more computer systems. These computer systems may be, for example, general purpose computer systems as, is known in the art. More particularly, a general purpose computer includes a processor, memory, storage devices, and input/output devices as is well-known in the art. The general purpose computer system may execute an operating system upon which one or more systems may be designed using a computer programming language. Example operating systems include the Windows 95, 98, or Windows NT operating systems available from the Microsoft Corporation, Solaris, HPUX, Linux, or other Unix-based operating system available from Sun Microsystems, Hewlett-Packard, Red Hat Computing, and a variety of providers, respectively, or any other operating system that is known now or in the future.

Figure 5:
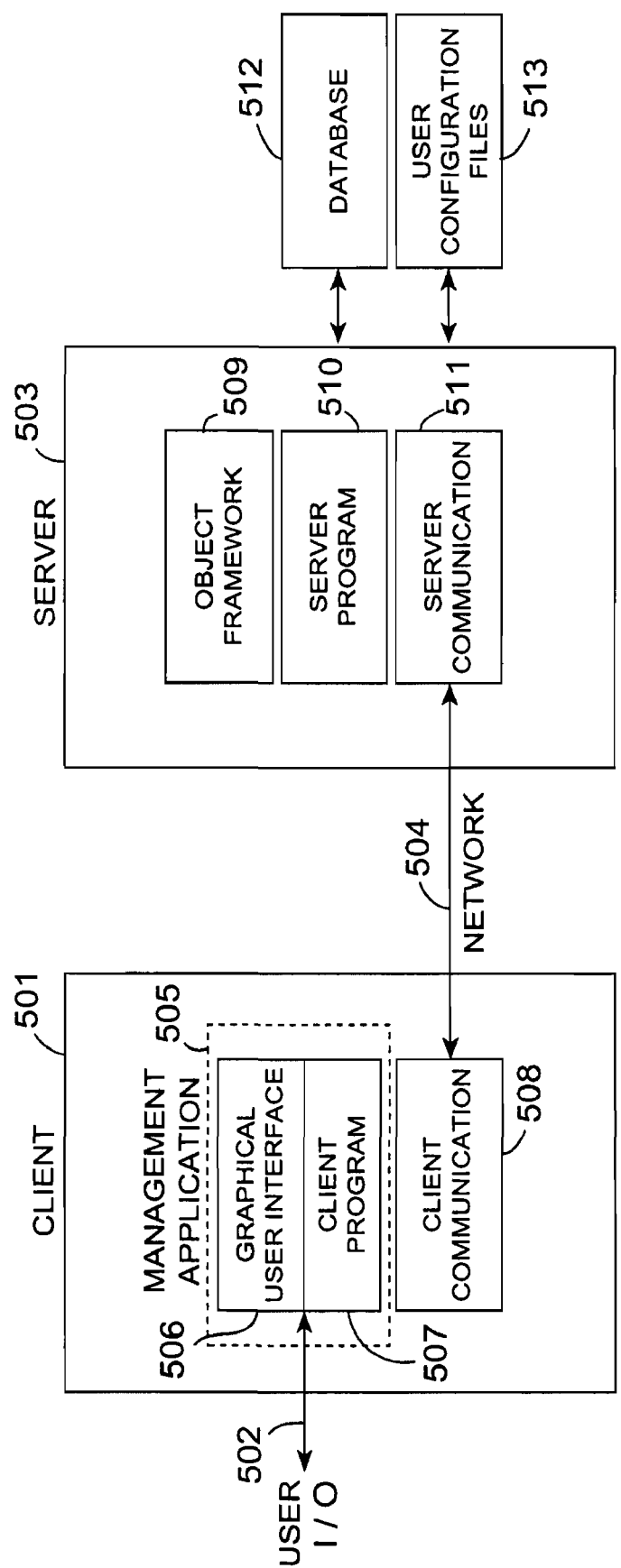
FIG. 5 is a block diagram of a client-server system suitable for implementing various embodiments of the invention.

FIG. 5 shows a number of general purpose computers functioning as a client 501 and server 503. In one embodiment, data processing application 107 may function as one or more processes executing on server 503. In particular, there may be a server program 510 which performs one or more operations on a continuous data stream 102. In one embodiment, server 503 includes an object framework 509 which serves as an applications programming interface that may be used by a programmer to control processing of server program 510. Client 501 may include a management application 505, through which a user performs input and output 502 to perform management functions of the server program 510. Management application 505 may include a graphical user interface 506 that is configured to display and accept configuration data which determines how server program 510 operates. Management application 505 may also include an underlying client program 507 which manages user information and provides the user information to server program 510. Communication between client 501 and server 503 is performed through client communication 508 and server communication 511 over network 504. Client and server communication 508, 511 may include, for example, a networking protocol such as TCP/IP, and network 504 may be an Ethernet, ISDN, ADSL, or any other type of network used to communicate information between systems. Client-server and network communication is well-known in the art of computers and networking.

Server 503 may, for example, store results 108 into one or more databases 512 associated with server 503. In one embodiment, database 512 is a parallel relational database. Server 503 may also store a number of user configuration files 513 which describe how server program 510 is to operate.

As discussed, data processing application 107 may be a client-server based architecture. This architecture may be designed in one or more programming languages, including JAVA, C++, and other programming languages. According to one embodiment, data processing application 107 is programmed in C++, and a C++ framework is defined that includes components or objects for processing data of data streams. These objects may be part of object framework 509. For example, there may be components for splitting, merging, joining, filtering, and copying data. Server program 510 manages execution of the data processing application 107 according to the user configuration file 513. This configuration file 513 describes underlying computer system resources, such as network names of processing nodes and computer system resources such as disk space and memory. The database 512 may be used to store related application information, such as metadata including schemas that describe data layouts, and any user-defined components and programs.

Figure 6:
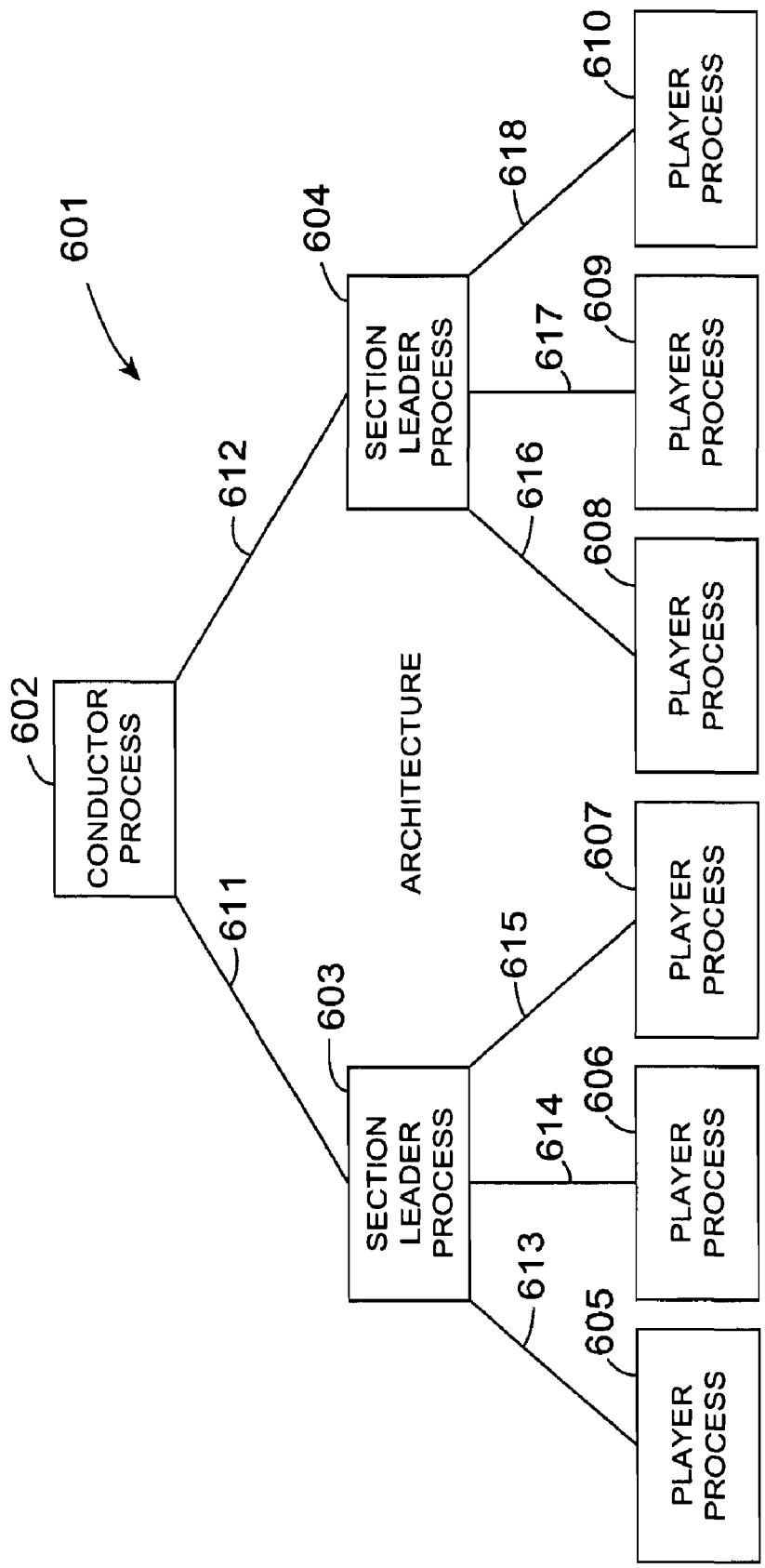
FIG. 6 is a block diagram of a processing architecture used to process data.

FIG. 6 shows an architecture 601 framework through which data processing application 107 may be implemented. There may be, for example, multiple layers that comprise architecture 601. For example, architecture 601 may include a conductor process 602 which is responsible for creating single program behavior. In particular, process 602 establishes instance of the data processing application 107. Conductor process 602 may also spawn section leader processes 603 and 604. In one embodiment, the conductor process 602 spawns section leader processes 603 and 604 at the same of different systems, using the well known Unix command "rsh" which executes remote commands. In one embodiment, section leader processes are spawned one per physical computer system. Each section leader process 603-604 spawns player processes, one for each data processing operator 106 in the data flow, via the well-known fork( ) command. The conductor, may be for example, executed on the same or separate computers as the section leader and/or player processes 605-610.

Conductor process 602 communicates with section leader processes 603-604 by sending control information and receiving status messages along connections 611, 612, respectively. The section leader processes 603-604 likewise communicate to player processes 605-610 by issuing control information and receiving status and error messages. In general, the conductor process 602 consolidates message traffic and ensures smooth program operation. In the case of a player process 605-610 failure, section leader processes 603-604 help program operation, terminating their controlled player processes and notifying other section leaders to do the same.

Data processing application 107 may have associated with it, an I/O manager for managing data throughout the framework. I/O manager may, for instance, communicate with the conductor process (or operator) to handle data flow throughout the architecture, and may communicate information to a data manager that is responsible for storing result data.

I/O manager may provide one or more of the following functions:

Provides block-buffered transport for data movement throughout the framework.

Provides block I/O services to the data manager, i.e. the I/O manager hands off blocks to the data manager.

Provides persistent storage services for the framework by storing, for example, blocks in files specified by the data manager.

Provides buffering and flow control for deadlock avoidance.

In one embodiment, the I/O manager may provide a port interface to the data manager. A port may represent a logical connection. Ports may be, for example, an input port (an "inport") or an output port (an "outport"), and may be virtual or physical entities. An outport represents a single outbound stream and is created for each output partition of a persistent dataset. For virtual ports, the process manager (conductor) creates connections between player processes. According to one embodiment, any virtual output port of a particular player process can have a single connection to a downstream player process. In a similar fashion, inports represent a single inbound stream, and one input port may be created for each inbound data stream. Inbound data streams for input virtual ports may be merged non-deterministically into a single stream of data blocks. Ordering of data blocks may be preserved in a given partition, but there may be no implied ordering among partitions. Because there is no implied ordering among partitions, deadlock situations may be avoided.

Figure 7:
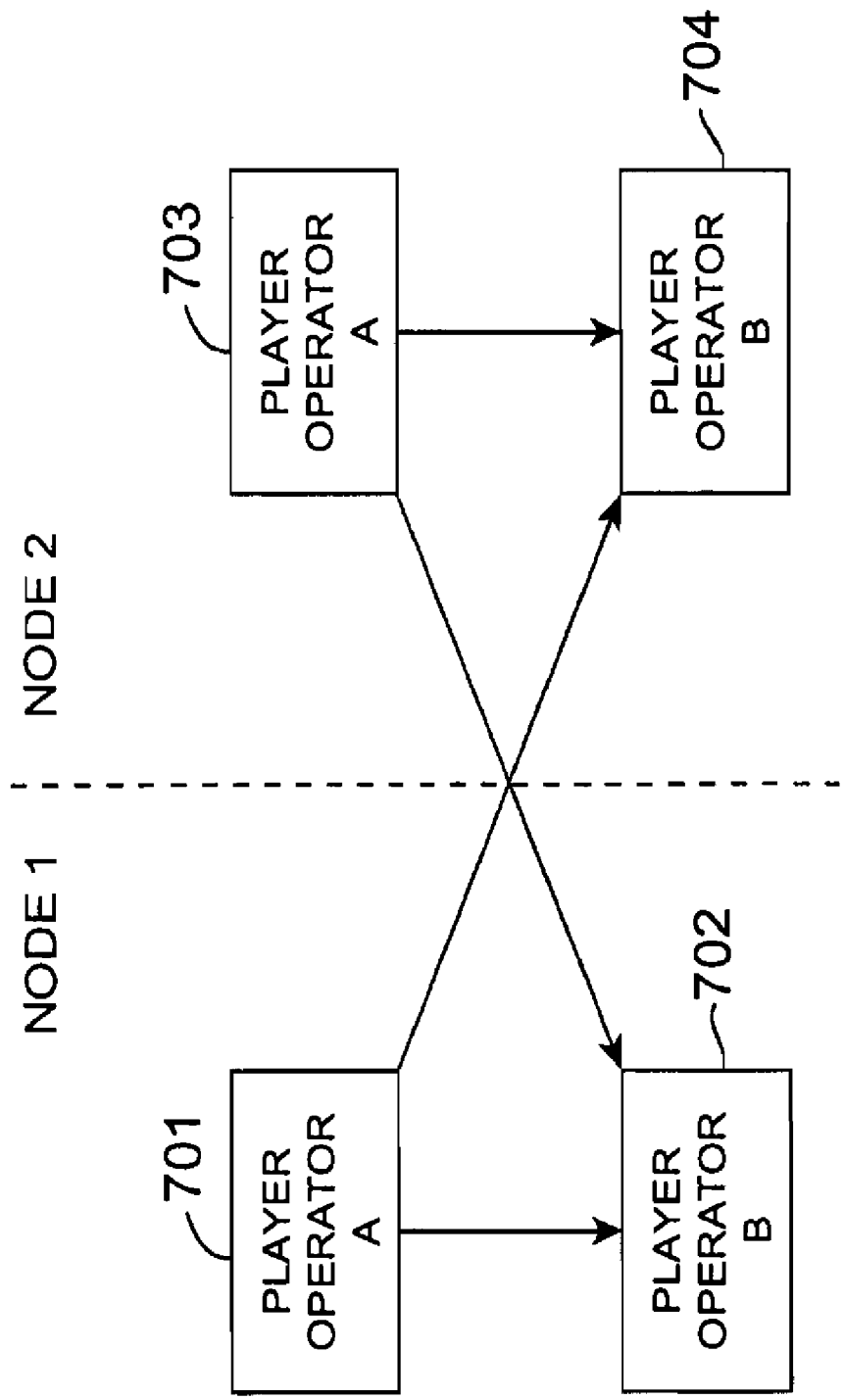
FIG. 7 is a block diagram of a two-node system having operators that communicate in a parallel manner.

FIG. 7 shows a series of logical connections that may be established between two nodes 1 and 2, each having separate instances of operators A and B. In particular, node 1 includes a player operator (or process) A 701 and a player operator B 702, wherein operator A provides data in a serial manner to operator B for processing. Further, operator A 703 of node 2 may also provide information in a serial manner to player operator B 702 of node 1. In a similar manner, player operator A 701 may provide data for processing by payer operator B 704 of node 2. One or more logical connections setup between operators 701-704 may facilitate this data transfer. In this manner, communication between parallel pipelined processes may occur.

Having now described a few embodiments, it should be apparent to those skilled in the art that the foregoing is merely illustrative and not limiting, having been presented by way of example only. Numerous modifications and other embodiments are within the scope of one of ordinary skill in the art.

For example, prior to segmentation of the continuous stream of data 102, the data may be filtered to eliminate records that do not assist in or that may bias or otherwise impact the analysis of the data. For example, where the continuous stream of data is a log of information to eliminate information about requests issued to a server, the log may be filtered about one or more requests. The kinds of information that may be eliminated include information about requests associated with various entities including computer programs called "spiders," "crawlers" or "robots." Such a program executed by a search engine to access file servers on a computer network and gather files from them for indexing. These requests issued by spiders, crawlers and robots also are logged in the same manner as other requests to a server. These programs have host names and agent names which may be known. The filtering operation may filter any requests from users having names of known spiders, crawlers or robots. A server also may have a file with a predetermined name that specifies what files may be accessed on the server by spiders, crawlers and robots. Accesses to these files may be used to identify the host or agent name of spiders, crawlers or robots, which then may be used to filter out other accesses from these entities. Programs are readily available to detect such spiders, crawlers and robots. Further, elimination of duplicate data records or other data cleaning operations may be appropriate. Such filtering generally would be performed prior to applying the transactional semantics to segment the continuous stream of data, but may be performed after the data is segmented. These and other modifications are contemplated as falling within the scope of the invention.

What is claimed is:

1. A method for processing transaction data, the method comprising:
   applying, by a segmenter, transactional semantics to a continuous stream of transaction data, from multiple data sources that are operational, to identify a plurality of segments in the continuous stream of transaction data, wherein the continuous stream of transaction data is from at least one transaction in progress, and wherein each of the plurality of segments contains transaction data;
   processing, by a data processing operator, each data segment within the identified plurality of segments in the continuous stream of transaction data based on the applied transactional semantics for each transaction data, to produce a stream of records in real-time;
   determining whether a particular portion of transaction data in the continuous stream of transaction data is in a sequence;
   if the particular portion of transaction data is determined to be out of the sequence, interrupting the processing step, inserting the particular portion of transaction data in a particular segment in the plurality of segments according to the transactional semantics, reprocessing the particular segment, and continuing the action of processing; and
   responsive to the processing, storing the real-time stream of records in a storage device.

2. The method of claim 1, wherein the plurality of segments in the continuous stream of transaction data includes a plurality of records, wherein each of the plurality of records includes a plurality of fields, and wherein the transactional semantics define a function of at least one record in the plurality of records.

3. The method of claim 1, further comprising:
   partitioning the continuous stream of transaction data into the plurality of segments.

4. The method of claim 3, wherein the partitioning comprises:
   inserting a record in the continuous stream of transaction data indicating a boundary between two segments.

5. The method of claim 4, wherein the record is a marker record indicating only the boundary.

6. The method of claim 4, wherein the record is a semantic record including information related to the transactional semantics.

7. The method of claim 1, wherein the continuous stream of transaction data is a log of information relating to a plurality of requests issued to a server, and wherein applying comprises:
   reading information relating to one of the plurality of requests from the log of information; and
   applying the transactional semantics to the information.

8. The method of claim 7, wherein the information relating to the one of the plurality of requests includes a plurality of fields, and wherein the transactional semantics are defined by a function of the plurality of fields.

9. The method of claim 8, wherein the information relating to the one of the plurality of requests includes a time at which the one of the plurality of requests was issued to the server, and wherein the transactional semantics define a period of time.

10. The method of claim 1, wherein the continuous stream of transaction data is a set of log files comprising streams of log file data relating to automatic requests issued to a server, and wherein the method further comprises:
    filtering the log to eliminate information relating to requests associated with spiders.

11. The method of claim 1, further comprising:
    filtering the continuous stream of transaction data to eliminate data from the continuous stream of transaction data.

12. The method of claim 1, further comprising:
    an additional step of processing the transaction data in each of the plurality of segments of the continuous stream of transaction data to produce additional results for each of the plurality of segments; and
    responsive to the additional step of processing, outputting the additional results produced for each of the plurality of segments to a storage device.

13. The method of claim 1, wherein processing comprises:
    partitioning the transaction data in each of the plurality of segments into a plurality of parallel partitions; and
    processing each of the plurality of parallel partitions in parallel to output intermediate results for each of the plurality of parallel partitions.

14. The method of claim 13, further comprising:
    combining the intermediate results of each of the plurality of parallel partitions to produce results for each of the plurality of segments.

15. The method of claim 1, wherein the transaction data in the continuous stream of transaction data has a sequence.

16. The method of claim 1, further comprising:
    saving a persistent indication of a current segment that is currently being processed in the action of processing;
    responsive to detecting a failure in processing the transaction data, discarding the current results and reprocessing the current segment; and
    responsive to a successful processing of the transaction data, outputting the current results to a storage device.

17. A memory comprising a computer program product for processing a continuous stream of transaction data from at least one transaction in progress, the computer program product comprising:
    instructions for applying, by a segmenter, transactional semantics to the continuous stream of transaction data, from multiple data sources that are operational, to identify a plurality of segments in the continuous stream of transaction data, wherein the continuous stream of transaction data is from at least one transaction in progress;
    instructions for inserting data in the continuous stream of transaction data indicating boundaries between the plurality of segments of the continuous stream of transaction data;
    instructions for processing transaction data, by a data processing operator, in each of the plurality of segments of the continuous stream of transaction data to produce a stream of records in real-time for each of the plurality of segments;
    instructions for determining whether a particular portion of transaction data in the continuous stream of transaction data is in a sequence; and
    responsive to a determination that a particular portion of transaction data is out of the sequence, instructions for interrupting the processing step, inserting the particular portion of transaction data in a particular segment in the plurality of segments according to the transactional semantics, and reprocessing the particular segment.

18. The memory of claim 17, wherein the continuous stream of transaction data represents user input associated with the at least one transaction in progress.

19. The memory of claim 17, wherein the continuous stream of transaction data comprises data selected from the group consisting of a reservation system, a point-of-sale system, an automatic teller machine, a banking system, a credit card system, a search system, and an audio/video distribution system.

20. The memory of claim 17, wherein the instructions for filtering the continuous stream of transaction data to eliminate data from the continuous stream of transaction data are executed prior to the instructions for applying transactional semantics to the continuous stream of transaction data to identify the plurality of segments of the continuous stream of transaction data.

* * * * *